INVENTOR.
Hachiro Yamashita

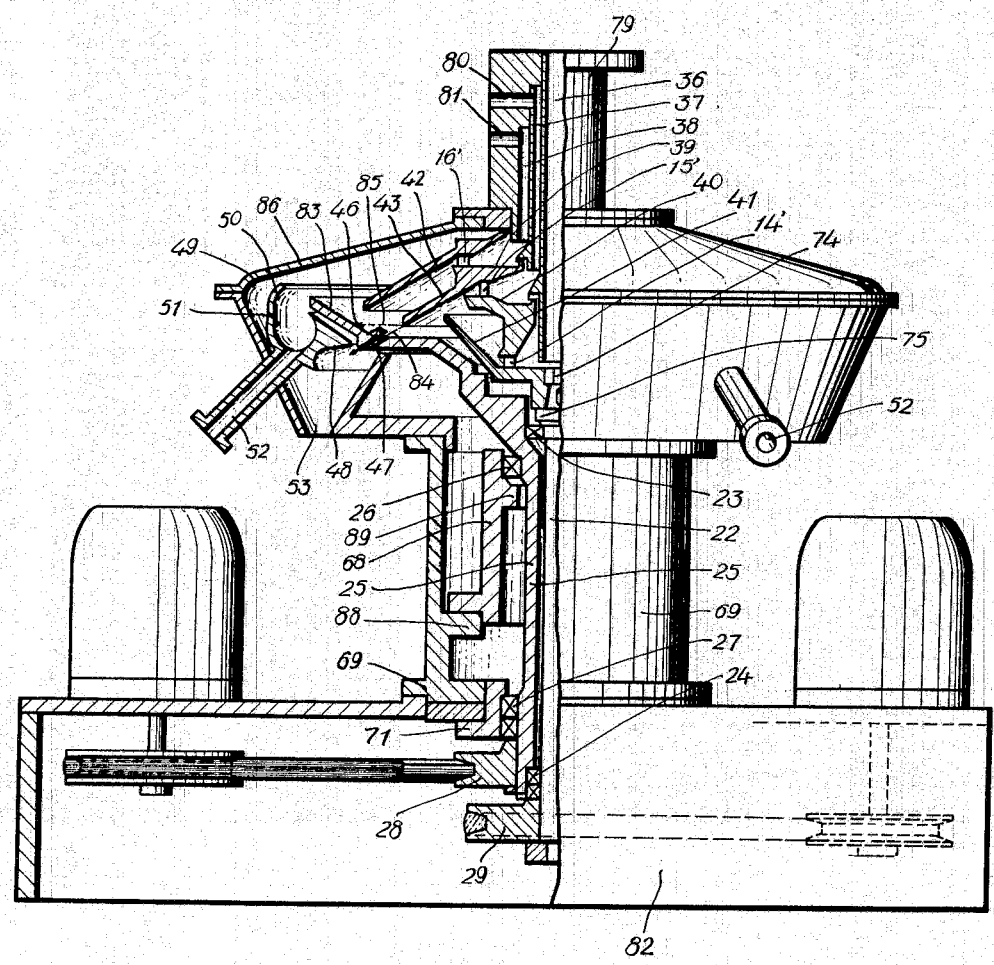

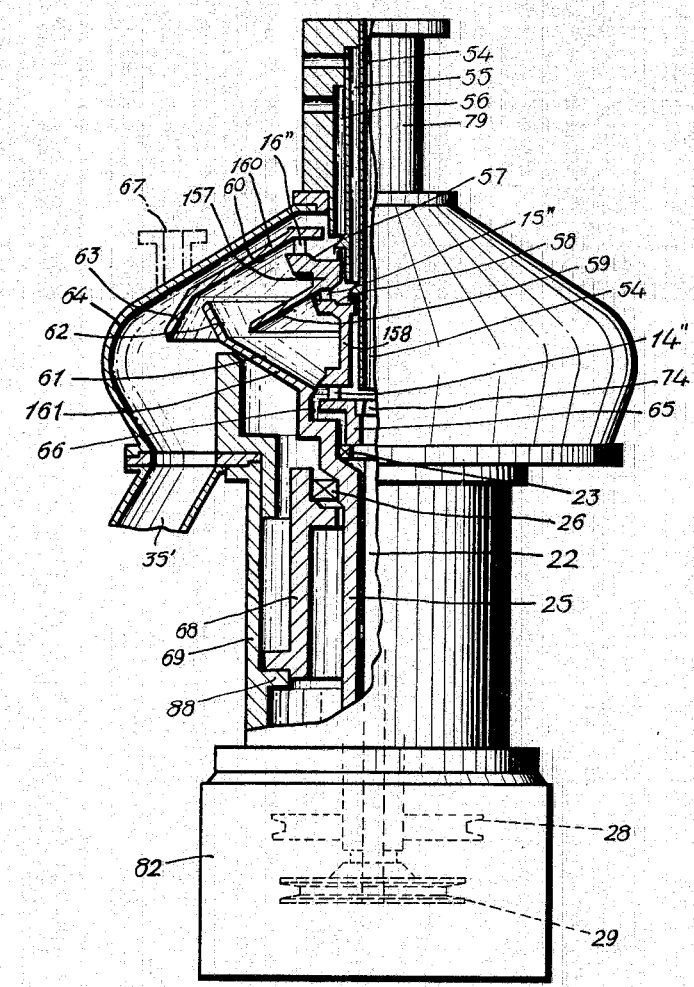

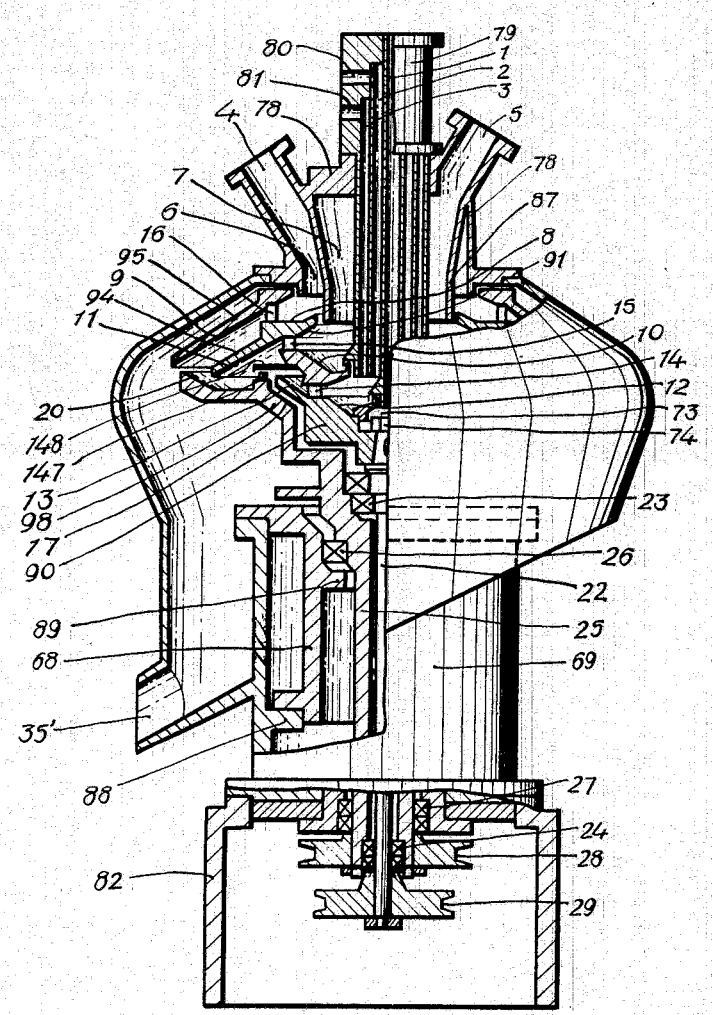

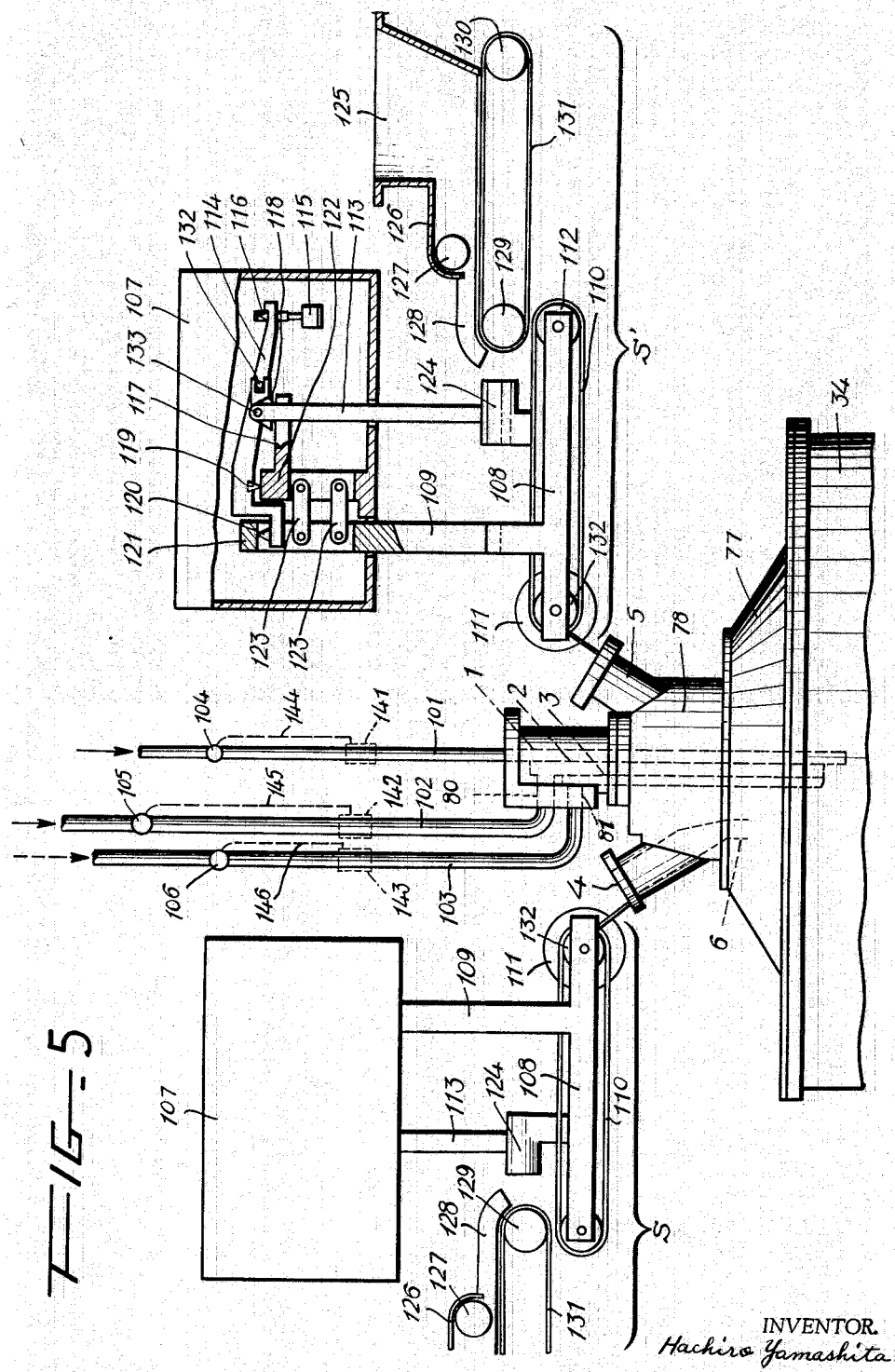

United States Patent Office

3,357,798
Patented Dec. 12, 1967

3,357,798
CENTRIFUGAL APPARATUS FOR OBTAINING CHEMICAL REACTIONS
Hachiro Yamashita, Omiya, Saitama Prefecture, Japan, assignor of one-third to Takara Koki Kabushiki Kaisha and one-third to Kiyoka Mukai, both of Tokyo, Japan
Filed Nov. 21, 1963, Ser. No. 325,510
Claims priority, application Japan, Nov. 22, 1962, 37/51,060
The portion of the term of the patent subsequent to Dec. 29, 1981, has been disclaimed
16 Claims. (Cl. 23—285)

The present application is a continuation-in-part application of my copending application Ser. No. 802,452 filed Mar. 27, 1959, now U.S. Patent No. 3,163,402.

The present invention relates to a reaction machine and to a reaction method, and more particularly to a machine which is capable of carrying out chemical reactions at high speed and to a method employing the reaction machine of the invention for carrying out chemical reactions as required in various chemical industries, particularly in the industries producing synthetic resins, metals such as ferrite alloy or powder metallurgy, petroleum, food and ceramics.

For example, in the synthetic resin industry, it is common practice to utilize polymers obtained by a preceding polymerization of the monomer in the manufacture of molded articles. This method of the prior art requires not only expensive equipment for the conversion of the monomer to a polymer, but also time-consuming operational steps as well as the necessity of a suitable heating or maintenance of a high temperature required for the polymerization. A substantial amount of a catalyzer is also required, and since the polymer obtained from the polymerization of the monomer is susceptible to impurities, it is necessary to clean the polymer or to treat the same with reactants, such as oxidizing and reducing agents which do not detrimentally affect the polymer. However, it is difficult to remove impurities from the polymer by this type of treatment, since impurities will frequently be strongly bound to the polymer, and under such circumstances some damage to the polymer by the reactants is unavoidable. No satisfactory molded articles can be manufactured without first treating the polymer in the above explained expensive and time-consuming manner.

In accordance with the prior art, the chemical reaction between the reactants is effected in an imperfectly mixed condition, which necessarily requires the maintenance of a reaction atmosphere, as well as a great deal of time in order to carry out a successful reaction, even though the mixing is carried out by agitation and with a substantial amount of a catalyst. Consequently the polymerization is an indispensable intermediate step for obtaining molded articles in accordance with the prior art.

It is an object of the present invention to provide a perfect mixing of the reactants so that the molecules of the reactants are arranged adjacent to each other.

A related object of the invention is to form molded articles directly from a monomer without polymerization by mixing the reactants in such a manner that the molecules of the reactants are located adjacent each other throughout the entire mixture.

Another object of the invention is to reduce the cost of manufacture of articles consisting of a synthetic resin by eliminating the polymerization step, and the cleaning of the resin from impurities.

Another object of the invention is to obtain finished articles made of synthetic resin which are free of impurities and of excellent quality, and which require not more than the theoretically necessary amount of reactants.

Particular objects and advantages of the present invention as applied to the manufacture of articles of synthetic resin have been discussed above, but the machine and method of the invention is also eminently suitable for other chemical industrial processes, particularly in the manufacture of metal articles, ceramics, foodstuffs, and petroleum products.

For example, in the metallurgical processes using metal powders, a mechanical mixer is continuously operated for several days and nights in order to compound the various substances in a uniform manner. Nevertheless, in accordance with the prior art, a uniform compounding and mixing could not be accomplished for microscopic particles, and even further continuation of the mixing cannot improve the quality of the mixture beyond a certain optimum, even if a catalyst is used in a substantial amount. Conventional methods of mixing and reacting metal powders do not achieve a perfect compound, even if the theoretically best compounding ratio is employed.

It is an object of the present invention to provide a reaction machine and reaction method in which the molecules of reactants are placed adjacent each other to achieve a rapid and perfect reaction between the reactants.

Another object of the invention is to provide a reaction machine in which several reactants are spread on rotating surfaces and then thrown by the centrifugal force beyond the edges of the rotating surfaces to impinge another, preferably rotating surface where the reactants are combined and mixed continuously in extremely thin layers so that rapid reaction takes place.

With these objects in view one embodiment of a reaction machine according to the present invention comprises a plurality of rotary members, preferably rotating about a vertical axis, and supply means for supplying reactants to the rotary members so that the reactants are moved by the centrifugal force to mix and react with each other. For this purpose, each rotary member has at least one, but preferably several rotating surfaces which are arranged in such a manner that the reactant spread over one surface will be carried by the centrifugal force beyond the peripheral edge of the same, and impinge another rotating surface on which another reactant moves under the action of centrifugal force.

Preferably, the surfaces are surfaces of revolution, for example frusto-conical surfaces which are alternately dished in opposite direction. For example, assuming a vertical axis of rotation, a downwardly concave frusto-conical surface will surround the peripheral edge of an upwardly concave frusto-conical surface.

The surfaces of revolution may rotate at the same speed, and be provided on one rotary member. In the preferred embodiment of the invention, two rotary members are provided, each having surfaces of revolution inclined to the axis of rotation, with the surfaces of the two members surrounding each other so that the reactants, or a preliminary reaction mass can move under the action of the centrifugal force to the rotating surface of the other member. Means are provided for rotating the two rotary members relative to each other, preferably in opposite directions.

A reaction machine according to the invention is particularly suited for carrying out the reaction method of the invention according to which a plurality of reactants are supplied to a plurality of surfaces rotating about an axis so that the reactants are respectively spread in thin layers over the surfaces by the centrifugal force and pass beyond the peripheral edges of the surfaces to be received on another surface located opposite and outwardly the peripheral edges of the first mentioned surfaces. Preferably, the other surface of revolution rotates, and another reactant is supplied to the other surface of revolution to mix and react with the first-mentioned reactants.

The mixing of two reactants will produce a reaction mass which is, for example, mixed with a third reactant, or with a third and a fourth reactant, to form another reaction mass to which a further reactant may be added, or which may be divided into solid and liquid parts by means provided on one embodiment of the reaction machine of the present invention.

This embodiment is based on the fact that liquid particles of a mixture will be thrown out in horizontal direction from the peripheral edge of a rotating frustoconical surface rotating about a vertical axis, while solid particles will move in the direction of the slanted surface, for example along a downwardly inclined path, if the frustoconical surface is downwardly concave. Due to the different paths of movement of the liquid and solid particles, the same can be separated and recovered independently by suitably arranged guide surfaces which are advantageously provided on a rotating member.

In accordance with the present invention, the reactants are continuously charged to the rotating surfaces by supply conduits in the center region of the rotating members, and such supply conduits are advantageously several tubular conduits surrounding each other and forming annular supply conduits.

In accordance with the present invention, feeding apparatus is provided which will feed the reactants in accurately measured uniform amounts continuously to the supply conduits.

The several reactants supplied through the axially extending supply conduits to the center regions of several rotating surfaces will be spread in a thin film or layer on the respective surface, pass from one surface to the other, and will be mixed in such finely dispersed condition that instant reaction takes place.

In view of the fact that the operation of the reaction machine of the invention is continuous, and requires exactly measured continuously supplied amounts of reactants, it is also an object of the present invention to provide apparatus which automatically and continuously feeds exactly measured amounts of a substance supplied to the apparatus in large irregular quantities.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is a crossways side elevation, partially in axial section, and illustrating another modified embodiment of the invention for carrying out a first typical reaction and including means for dividing the reaction mass into liquid and solid parts;

FIG. 3 is a lengthways side elevation, partially in axial section and illustrating further another embodiment of the invention for carrying out another typical reaction;

FIG. 4 is a lengthways side elevation, partially in axial section, and illustrating another modification of the embodiment of FIG. 1 and particularly suited for carrying out a reaction in which the destructtion of powdered particles must be prevented; and FIG. 5 is a fragmentary side view of a reaction machine provided with feeding devices.

Figure 1:
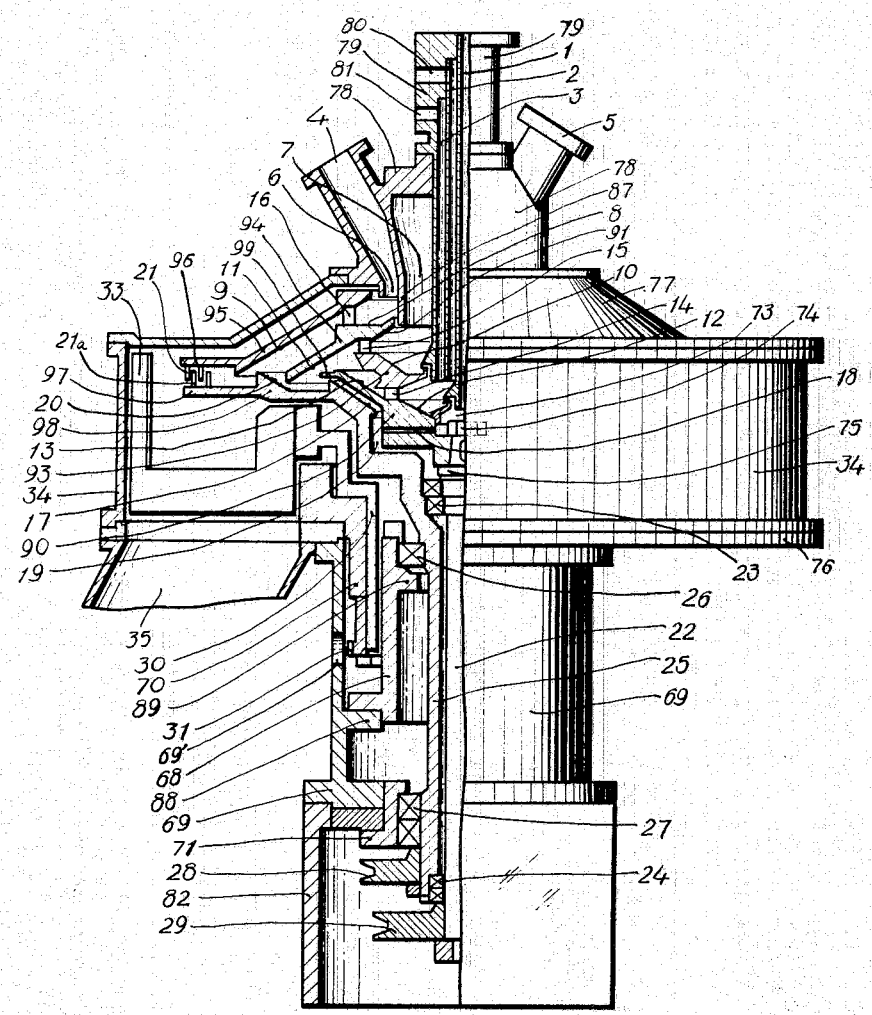
FIG. 1 is a lengthways side elevation, partially in axial section, and illustrating a reaction machine according to one embodiment of the present invention.

Referring now to the drawings, and more particularly to FIG. 1, a cylindrical casing 34 is mounted on a tubular support 69 which rests on a base structure 82. The bottom of casing 34 is closed by a bottom plate 76 provided with an outlet 35. The top of casing 34 is closed by a cover member 77 whose center portion is provided with supply means for charging the machine with several substances which are to react with each other in the machine. The supply means include a vertical supply conduit 1 which is coaxial with the axis of the cylindrical casing 34. Two vertical conduits 2 and 3 surround conduit 1 and form annular supply passages around the same. The upper end of supply conduit 2 is located below the open end of supply conduit 1 and has an inlet 80 provided in a tubular cap element 79. The upper and of conduit 3 is located still lower, and communicates with a lower inlet 81. A tubular member 78 of greater diameter supports member 79, and rests on a frustoconical portion of cover member 77. The tubular member 78 forms another supply conduit 7 around conduit 3 to which a substance can be fed through the inlet 5. Another inlet 4 communicates with a further supply conduit 6 which is separated by wall portion 87 from supply conduit 7. All conduits, except conduit 1 are of annular configuration.

The lower ends of conduits 2 and 3 are located at the same level, and are slightly higher than the lower end of conduit 1. Conduits 7 and 6 open into the interior of casing 34, 77 at even higher staggered levels.

The annular concentric supply conduits are disposed in this manner to supply different substances to annular surfaces of rotary members provided in the casing of the machine.

A vertical shaft 22 is mounted in bearings 23 and 24 which are located within a hollow shaft 25 coaxial with shaft 22. Shaft 25 is mounted in an upper bearing 26 on a tubular supporting element 98 which rests on a flange 88 of tubular support 69, and bearing 27 is supported on a circular member 71 secured to the base 82 of the machine. A pulley 29 is secured to the lower end of shaft 22, and the pulley 28 is secured to the lower end of the hollow shaft 25. Pulleys 28, 29 are connected by belts to two motors which are adapted to rotate shafts 22 and 25 at different speeds, and preferably in opposite directions. The motors, not shown, are arranged in the broken off end portion of base 82, as shown in FIG. 2.

The upper end of shaft 22 has a flange 75, a conical journal portion, and a threaded end portion on which a nut 74 is mounted for clamping the hub portion of a member 90 against flange 75 so that member 90 rotates with shaft 22. Member 90 is dished, and has an upper conical surface 12 which forms with an annular member 93, and with an annular member closely surrounding the lower end of conduit 1, an annular chamber into which conduits 2 and 3 open. Member 93 is supported on member 90 by a plurality of circumferentially spaced narrow posts 14 so that substances serving as reactants supplied through conduits 2 and 3 into the annular chamber between members 93 and 90 will pass outwardly onto another frusto-conical surface 13 of member 90 when the same is rotated so that the reactants supplied through conduits 2 and 3 are subjected to the action of the centrifugal force.

The top of member 93 has a horizontal annular surface on which a plurality of circumferentially spaced narrow supporting posts 15 are provided for supporting another member 94 which has a downwardly concave frustoconical inner surface 11 extending transversely to the frusto-conical upwardly concave inner surface 10 of member 93, and to the frusto-conical surface 13 which is substantially parallel to surface 10. The surface 10 of member 93 and the surface 91 of member 94, together with conduit 3, form an annular chamber into which supply conduit 7 opens so that another reactant can be supplied through inlet 5, and conduit 7 to surface 10 of member 93. Consequently, during rotation of members 90 and 93, the reactants supplied through conduits 2, 3 and 7 will move along surfaces 12, 13 and 10 in a thin layer or film and then pass over the peripheral edges of surfaces 10 and 13 to impinge surface 11 of member 94 where the reactants are superimposed in thin layers while moving rapidly along surface 11 under the action of the centrifugal force. Evidently, only one of conduits 2 and 3 may be used if mixing of only two reactants is desired.

On the top of member 91, another member 95 is mounted by means of circumferentially spaced posts 16. Member 95 has a downwardly concave inner frusto-conical surface 9 which extends substantially parallel with surface 9 of member 94. A horizontal annular peripheral portion 96 projects from the outer peripheral edge of member 95 and is provided with projections 21 intermeshing with corresponding projections 21a on an annular peripheral horizontal flange 97 of a rotary member 98 which is integral with the hollow shaft 25, and can be rotated in a direction opposite to the direction of rotation of shaft 22 and members 90, 93, 94, 95 and 96.

Member 90 is provided with an inner cavity 73 below the lower end of conduit 1 and extending around nut 74. Conduits 18 extend in radial direction through member 90 and into an annular chamber 19 formed between a cylindrical portion of member 98 and a cylindrical surface of member 90. When another reactant is supplied through conduit 1, it passes through chamber 73 and under the action of the centrifugal force through passages 18 into chamber 19 and from there to an upwardly concave frusto-conical surface 17 of rotary member 98. The peripheral edge of surface 17 is located opposite horizontal circumferentially spaced projections 99 near the peripheral edge of surface 13 of member 90, so that a substance moving outwardly on surface 17 under the action of centrifugal force is first somewhat disturbed by projections 99 and then impinges surface 11 of member 94.

Reactants thrown from surfaces 10, 13 and 17 against surface 11 travel outwardly on the same and finally impinge an upwardly directed frusto-conical surface 20 on member 98 which rotates opposite to the direction of rotation of member 94. The combined reactants may already have reacted so that the reaction mass passes outwardly on surface 20 and impinges the inner surface 9 of member 95 which rotates opposite to the direction of rotation of surface 20. A reactant supplied through inlet 4 and conduit 6 will pass between posts 16 toward surface 9 and react with the partly reacted mass coming from surface 20. The thus formed reaction mass passes over the peripheral edge of surface 9 toward the top surface of the horizontal portion 97 where it travels outwardly due to the rotation of member 94 so that the reaction mass is further divided into fine particles by the intermeshing projections 21, 21a, and is finally ejected toward the inner cylinder surface of casing 34 from which it is scraped by rotary scrapers 33 which are connected to a tubular drive member 30 having at the lower end thereof a gear 31 meshing with a drive gear of another motor, not shown, which drive gear projects inwardly through an opening 69' in the tubular support 69 into meshing engagement with gear 31. An annular bearing support 70 is mounted in the casing to rotatably support the tubular drive portion 30 of the scraping members 33. The reaction mass finally falls through the outlet 35 into a suitable container, not shown.

As is clearly shown in the drawing, the circular peripheral edges of the frusto-conical surfaces of the rotary members are sharp edges having in cross section an acute angle by which the passage of the reactants beyond the peripheral edges is influenced.

The reaction machine illustrated in FIG. 1 operates as follows:

Pulleys 28 and 29 are driven at high speed in opposite directions so that rotary member 90, 93, 94, 95, 96 rotates in one direction, and rotary member 98, 97 rotates in the opposite direction.

A reactant charged through conduit 1 passes through chamber 73, passage 18, chamber 19, is thinly spread over the surface of revolution 17 while travelling outwardly on the same until it is thrown against surface 11 rotating in opposite direction. Projections 99 will divide the material during the travel toward surface 11. The substance is spread on the outer portion of the rotating surface 11 and moves toward its peripheral edge. A second reactant substance introduced through conduit 2 is spread over surfaces 12 and 13 while travelling outwardly, and finally impinges surface 11 where it will mix with a thin layer of the first reactant supplied through conduit 1.

Conduit 3 may be used in the particular reaction for supplying a gas, for example for the maintenance of the reaction temperature, but may be used for feeding any other reactant in which event the other reactant will be combined with the reactant supplied through conduit 2 on the rotating surface 12 and then pass over surface 13 toward surface 11 together with the reactant supplied through conduit 2.

The wide inlets 4 and 5 are particularly suited for the supply of powderized substances. A powder entering through inlet 5 will pass through a wide annular conduit 7 onto the rotating surface 10 and be thrown against the rotating surface 11. Consequently, layers of rapidly moving reactants supplied through conduits 1, 2, 3 and 5 will mix and react on surface 11.

Another reactant in the form of a powder supplied through inlet 4 will pass through conduit 6 into the space between members 94 and 95 and will travel along the downwardly directed inner surface 9 in outward direction to combine with the partly reacted mass thrown from surface 20 against surface 9. The reaction mass then passes over the top surface of member 97 in outward direction between the intermeshing projections 21, 20a which divide the reaction mass into finer particles.

Each of the surfaces of revolution 11, 12, 13, 10, 20, and 9 is inclined to the vertical axis of rotation of the two rotary members rotating in opposite direction. The surfaces are shown to be frusto-conical with a constant slanting angle so that the substances supplied to the center portions of the surfaces will be uniformly spread on the surfaces in a thin film and layer while travelling outwardly under the action of centrifugal force. Due to the fact that the surfaces are inclined to the axis, the substances travelling on the surfaces are prevented from floating in the spaces between the rotating surfaces in which air currents exist due to the rapid rotation of the rotary members. Since the centrifugal force acts in horizontal direction during rotation about the vertical axis, the inclination of the surfaces causes a division of the centrifugal force into a first component urging the substances to move outwardly, and a second component urging the substances against the surfaces assuring a frictional contact with the surfaces. Due to this arrangement, the outwardly travelling particles adjacent the surfaces will encounter considerable friction, while particles of the substance not directly in contact with the respective surface will move at a greater speed in outward direction since the friction between superimposed layers of particles is lesser than the friction between the particles of the substance and the rotary surfaces. In this manner, a particularly thorough mixing of the particle is achieved on surfaces on which several reactants are combined, particularly surfaces 11, 20 and 9. Extremely thin layers of different reactants will move at different speeds in superimposed condition while being at the same time dispersed in circumferential direction due to the fact that the rotating surfaces have a greater area in the region of the outer peripheral portions than in the center regions. As a result, particles of substantially molecular size of several reactants are placed adjacent each other, and react immediately.

Surfaces 10, 13 and 17 prepare the reactants individually by spreading the same in a very thin layer before the reactants impinge the surface 11 on which the first reaction may take place. The spreading of the newly supplied reactants is particularly effective since the respective surfaces 10, 13 and 17 face upward so that the weight of the substance increases the frictional connection between the particles of the substance and the supporting rotary surfaces.

The embodiment illustrated in FIG. 1 permits the provision of a great number of surfaces of revolution in a very small space so that a great number of reactants may be used which pass over several surfaces to achieve a high degree of division into fine particles which takes place particularly when the substances pass over the sharp peripheral edges of the dish-shaped rotary members.

In the event that the substances to be mixed and reacted are of low viscosity, and have relatively large particles, or if it is desired to avoid a destruction of the particles existing in the supplied substances, then it is advisable to provide fewer rotary surfaces so that the material is not so often transferred from one rotary surface to another rotary surface. In certain cases, it will be sufficient to provide only two rotary surfaces so that only one transfer takes place, corresponding to the transfer of a substance from surface 13 to surface 11, which both rotate at the same speed, or to the transfer from surface 11 to surface 98 which rotate relative to each other. In accordance with another modification, only a pair of rotary surfaces corresponding to surfaces 20 and 9 whose peripheral edges are located substantially opposite to each other, may be provided so that two substances passing outwardly along such surfaces will mix in the space between portions 96 and 97.

On the other hand, for substances having a high viscosity and coherence, it is preferred to employ an even larger number of rotary surfaces than shown in FIG. 1 so that during the several transfers the cohesive forces holding the particles together will be considerably weakened so that finally a non-adhesive and uniformly compounded mixture may be obtained.

As explained above, the rotary members have sharp peripheral edges in the preferred embodiment of the invention. If the edges are dull or flat, the position of the substances passing outwardly beyond the edges will not be accurately defined and the material will spread from the edges which is undesirable and will disturb the uniform spreading, division, and dispersion of the substances. Furthermore, the air currents produced on the undersides of the rotary surfaces will generate eddy currents at the peripheral edges of the rotary members, which will interfere with the straight transfer motion and the uniform dispersion of the particles, particularly during the passage from the outermost rotary surface to the inner surface of the stationary casing. The sharp edges of the preferred embodiment overcome these difficulties, and a uniform and reliable comminuting action and a thorough dispersion of the material is assured.

The reaction mass formed of the mixed and compounded substances will be divided and dispersed by the intermeshing projections 21 and 21a which move relative to each other, preferably in opposite directions. The rotation of the rotary dish-shaped surfaces will generate air streams causing a higher pressure in the space between the two oppositely rotating members, than in the annular space between the casing wall and the rotating members. The pressure in the inner space is increased, and the pressure in the outer space is reduced. Consequently, air under pressure will pass between projections 21, 21a toward the inner surface of the cylindrical casing wall, spreading upward and downward to distribute the mass over the inner surface of the casing. This effect is useful for a reaction in which solid powdered substances are reacted with liquid additives since the distribution of the liquid additives over a layer of the solid substance can be achieved. The mixture discharged from the outermost peripheral portions 96, 97 will move along tangential lines toward the inner cylindrical surface of casing 34 due to the action of the centrifugal force. Consequently, the solid particles will not impinge on the casing wall in radial direction, and will not bounce back from the same although the impact takes place at considerable velocity.

The solid particles impinging the inner cylindrical surface of casing 34 will tend to move along a downwardly directed spiral path under the action of gravity and inertia while the speed of movement is progressively decreased until the particles are deposited on the bottom, or adhere to the cylindrical surface. Consequently, particles will be intimately and thoroughly mixed on the inner surface of casing 34 which will further improve the reaction rate between the several reactants, particularly if the reaction between solid and liquid reactants is to take place which is due to the fact that the frequency of contact between the solid particles is increased during the spiral movement along the inner casing surface while liquid material which was only partly deposited on a solid particle, will spread over the entire surface of the respective particle.

While a reaction between substances travelling along surfaces 9 and 11 on one hand, and surface 20 on the other hand is improved by rotating the surfaces in opposite directions, in certain cases where destruction of particles is to be prevented, all surfaces may rotate at the same speed and in the same direction, as is the case for surfaces 10, 13 and 11.

The substances travelling outwardly on the rotary surfaces will have a great speed gradient in radial direction which is in proportion to the thickness of the layer, and consequently the particles of the substances are prevented from accumulating due to shearing forces which are in proportion to the speed gradient. The centrifugal force on the particles of the substances, as well as the frictional forces between adjacent particles, and between the rotary surfaces and particles thereon, will cooperate to crumble and disperse the layer of the substance starting from the top face so that the particles disperse in radial direction. In the event that a liquid substance is supplied to a rotary surface, the viscosity index of the liquid may be considered to correspond to the inner resistance of the solid substances, at least as the treatment of the substances in accordance with the present invention is concerned.

Liquid droplets thrown outwardly from the peripheral edge of a rotary surface have a diameter which may be calculated in accordance with the foreign equation:

$$d = \frac{169}{N}, \frac{q^{0.2}}{D^{0.3}}$$

wherein N is the number of revolutions of the rotary surface per minute, q is the amount of supplied substance in pounds, and D is the diameter of the rotary surface.

The thickness of a liquid layer Z at the edge of the rotary surface is one third of the diameter of a droplet, and can be calculated in accordance with the following equation:

$$Z = 0.68 \frac{q}{2 N \cdot r^2}$$

wherein N is the number of revolutions of the rotary surface per minute, and r is the radius of the rotary surface, q is the volume rate.

The above equations are valid not only for liquids, but also for powder particles.

Particles thrown outwardly from the edge of the rotary surface will travel in a horizontal plane when the diameter of the particle or droplet is relatively small, but as the diameter increases, the particle will be thrown outwardly substantially in the direction of the rotary surface, that is inclined to the horizontal plane and to the vertical axis. If particles having substantially the same diameter are to be compounded, the diameter of the particles will determine the dispersing pattern of the particles in the proximity of the peripheral edge of the rotary surface, as defined by the above equations, with the values of N, D and q suitably selected.

If the particles of the substance supplied to the rotary surfaces have very different diameters and sizes, or if the viscosities of the substance are different, the particles of larger diameter will faster travel outwardly on the rotary surfaces than the particles of small diameter when the substances are supplied to the center portion of the rotary surface, and consequently a separation of particles according to size or diameter will take place.

In the preferred method of the present invention, the amount of substances supplied to the reaction machine is maintained absolutely constant, and in this event, uniformly mixed distribution patterns will be obtained regardless of the variations between the particle sizes, and differences in the sizes and diameters of the supplied substances will not cause any disturbance in the desired dispersing pattern.

The reaction ratio between solid, preferably powdered substances and liquid substances will depend on the speed of the rotary surface, on the size of the particles, and on the properties of the liquid. If the liquid is added in a small amount, for example less than about 15%, liquid droplets having a diameter of about 100 micron thrown from the peripheral edge of a rotary surface, will penetrate directly into the flowing layer of solid particles on the corresponding receiving surface, and will be enveloped by the solid particles to form pellets which will be finally pulverized upon passing through the projecting members 21, 21a, and no separation of liquid droplets from pulverized solid particles will occur.

However, if the diameter of the solid particles is great, the contact area between a liquid droplet and the solid particle is restricted, and thus the tendency to form pellets is reduced so that a separation between a droplet and a solid particle will more readily occur in pellets having a liquid layer on a solid particle when the mass passes through the projections 21, 21a. In this event, a small amount of condensated liquid may form on the inner surface of casing 34. This phenomenon of a separation between liquid and solid particles can be utilized in accordance with the present invention.

For example, if a liquid organic agent such as benzole is used, solid particles and the liquid agent may be mixed on a rotary surface, and then spread and thrown outwardly from the peripheral edge of the rotary surface in such a manner that separation of the liquid substance from the solid substance can be easily accomplished. The solid particles are of relatively large size and will be thrown outwardly beyond the peripheral edge in the direction of the conical surface which defines acute angles with the vertical axis and with the horizontal plane. On the other hand, the liquid droplets which are of relatively small size, will be thrown outwardly in a substantially horizontal plane. A suitable separating means can be arranged between the paths of movement of the liquid and solid particles so that the liquid and solid particles can be separated from each other. The liquid agent, having finished the extracting reaction and being thus separated from the solid substance, can then be recovered and used for other reactions, while the solid particles may be transferred to another rotary surface where they are again subjected to another extracting reaction and consequent separation. Consequently, the reaction machine of the invention is capable of accomplishing extracting reactions in a very short time, while the saturated reaction liquid can be separated from the reaction mass in a simple and continuous operation.

In accordance with the method of the invention gaseous substances may be used in reactions. As noted above, an air stream will be created along the rotary surfaces, and consequently it is evident that gaseous substances which are to be utilized for a reaction, can be directly supplied to the rotary surface where the reaction is to take place. Oxidizing, neutralizing, or reducing gases may be employed in accordance with the desired reaction. Furthermore, a gaseous medium of high temperature may be supplied to the reaction area for promoting the reaction, while on the other hand supply of a gaseous medium having a temperature lower than 0° C. may be used for stopping the reaction for a certain time interval. In this connection it may be noted that since the reactions carried out in accordance with the present invention are extremely rapid, under certain circumstances temporary stopping of the reaction may be occasionally required. While it is possible to heat and cool the machine by suitable apparatus, it is preferred to supply a gaseous medium of the desired temperature directly to the region of the rotating surfaces on which the reaction takes place. In this manner, the danger of the overheating and burning out of a bearing portion is avoided, which may happen if the machine itself is heated.

The eddy currents created by the air stream along the rotary downwardly facing surfaces, are advantageously utilized in promoting the reaction by vibrating the reactants. In this event, the peripheral edge of the rotary surface may be rounded off so as to have a certain thickness which will aid in the development of eddy currents, and the sharp peripheral edges which are advantageous for other purposes will not be provided.

The air currents created under the rotary surfaces may be advantageously used in feeding the gaseous medium required for a specific reaction. An elongated gap between two parallel dish-shaped rotary members having parallel frusto-conical walls may be used for this purpose.

The reaction machine illustrated in FIG. 1 is advantageously modified to carry out different types of reactions. The embodiment of FIG. 2 has shafts 24 and 25 which are driven as explained with reference to FIG. 1 to rotate two rotary members relative to each other, and preferably in opposite directions. Three concentric supply conduits 36, 37 and 38 are provided concentric with the vertical axis of rotation of shaft 24, and have lower ends which are staggered in vertical direction and extend into a casing 86 through an opening at the center of the top wall of the casing. A first rotary member is rotated by shaft 24 and includes dish-shaped members 41, 43, 42 each of which has a frusto-conical surface. Members 41, 42, 43 are connected to each other by posts 14', 15' and 16' as explained with reference to FIG. 1. A substance supplied through conduit 36 passes between posts 14' and outwardly along the upwardly concave frusto-conical surface of member 41 which is secured to flange 75 of shaft 24 by a nut 74. Shaft 24 is mounted in bearings 23 within shaft 25 which is mounted on bearings 26 on a supporting structure, not shown in FIG. 2. The upper part of the hollow shaft 25 is dish-shaped and terminates in a frusto-conical peripheral portion 83. Directly below the frusto-conical portion 83, an annular separating wall 46 is provided which has an edge located opposite and spaced from the peripheral edge of the frusto-conical portion 43 and forming an annular gap with the same. Portion 46 is inclined to the axis at the same angle as portion 43. Passage means 47 are located inwardly of portion 46 and communicate with a discharge outlet 53 formed in the lower portion of casing 86. A horizontal plane passing through the peripheral edge of frusto-conical portion 53 will intersect with the frusto-conical portion 83. A horizontal plane through the peripheral edge of frusto-conical portion 83 will intersect with a separating member 50, while an extension of the conical surface of portion 83 in upward direction will pass the edge of member 50. Member 50 forms a chamber 51 which has an outlet 52.

The arrangement is such that when a mixture of solid and liquid particles passes along the frusto-conical surface of portion 43, liquid particles will be thrown outwardly in a horizontal plane as indicated by the arrow 85 and impinge the frusto-conical surface of portion 83 to travel along the same in outward direction.

Solid particles will be thrown from the surface of portion 43 in the direction of the arrow 84 and along an imaginary conical surface defined by members 43 and 46. Consequently, the solid particles will be separated from the liquid particles by member 46 and will pass through passage 47 to the outlet 53. The liquid particles moving in the direction of the arrow 85 to surface 83 are mixed with a liquid reactant supplied through conduit 38 and travelling outwardly along the inner frusto-conical surface of portion 42. Due to the reaction between the two liquids on the surface of member 83, the reaction mass may contain another liquid and another solid, which are again separated due to the fact that the solid particles moves in the direction of the frusto-conical surface 83 toward the wall 49 of casing 86 and pass through outlet 53, whereas the liquid particles move in horizontal plane from the edge of surface 83 against separating member 50 and are discharged through outlet 52. Consequently, the embodiment of FIG. 2 is particularly suited for a reaction which may be represented by the following reaction formula:

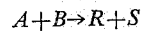

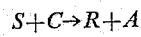

In the above equation, R represents the solid product, while the other substances are liquid. Consequently, liquids A and B are supplied through conduits 36 and 37 and form the reaction mass $R+S$ on portion 43 from which the solid substance R is separated and discharged through passage 47 and outlet 53, while the liquid S is mixed on surface 83 with the liquid C supplied through conduit 83 and forms the reaction mass $R+A$ which is divided by separating member 50 so that the solid substance R passes again through outlet 53, while the liquid A is collected from the outlet 52. The embodiment illustrated in FIG. 3 is designed for carrying out a more complex reaction, for example, the reaction between water and ethylene oxide, which may be represented according to the following formula:

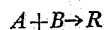

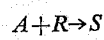

Three concentric feeding conduits 54, 55 and 56 are provided in an arrangement similar to the constructions of FIGS. 1 and 2 for supplying different reactants. A drive shaft rotates member 65 with rotary member 158 which has an upwardly concave spreading surface 58 for the reactant supplied to the annular conduit 55. Member 158 is mounted on member 65 by circumferentially spaced posts 14″ through which a reactant supplied through conduit 54 can pass outwardly into chamber 66 of a second rotary member 161 which preferably rotates in opposite direction, as explained with reference to FIG. 1.

Two further dished members 157 and 160 are secured by posts 15″ and 16″ to each other and to member 158 to form a single rotary member with several frusto-conical surfaces rotating at the same speed. Member 157 has a downwardly concave frusto-conical surface 59, and member 160 has a first downwardly concave frusto-conical surface 60, and an outer peripheral portion with a more steeply inclined frusto-conical surface 63. Member 157 has an upwardly concave frusto-conical surface 57 to which a reactant is supplied to the third conduit 56 and, after spreading on surface 57, is thrown toward surface 60 on which it travels outwardly due to the action of the centrifugal force. Rotary member 161 has, in addition to the frusto-conical surface 61, an outer peripheral portion with a more steeply inclined frusto-conical surface 62 whose outer edge is located opposite the circular edge formed by frusto-conical surfaces 60 and 63. A casing 64 surrounds the rotary members.

A substance corresponding to the reactant represented by B in the above formula is supplied through supply conduit 54 in a constant amount, and spreads over the surface 61 due to the action of the centrifugal force. At the same time a substance corresponding to the reactant A is supplied through supply conduits 55, 56 in a constant amount per time unit. The reactant A moving over the surface 59 is added to the reactant B moving over surface 61 and reacts with the latter to form the reaction mass R.

During the movement of the mass over the sharply inclined surface 62, the pressure against the surface 62 is increased as compared with the pressure exerted by the mass on surface 61 since the centrifugal force acts in a horizontal direction and has a greater component perpendicular to surface 62 than to surface 61. This causes higher friction and more thorough mixing promoting the reaction. The reaction mass R is thrown outwardly from the peripheral edge of surface 62 toward surface 60 on which reactant A, supplied through conduit 56 and over surface 57, moves in outward direction in a thin layer. The reactants A and R are thus mixed and react particularly on the surface 63 where they are subjected to greater pressure by the centrifugal force in a manner which will promote reaction and formation of the reaction mass S. The reaction mass will be thrown from the peripheral edge of surface 63 against the inner surface of casing 64, and may be discharged through a suitable outlet. Pressure, temperature, and reaction atmosphere can be controlled as described with reference to the embodiments shown in FIGS. 1 and 2 by supplying a gaseous medium through an additional conduit into the casing.

The embodiment illustrated in FIG. 4 is a modification of the machine shown in FIG. 1 and is particularly adapted to carry out a reaction in which a reactant is a powder, and must be carefully treated to prevent destruction of the powder particles.

In the embodiment of FIG. 4, a rotary member 90' has a short frusto-conical surface 13 terminating in a sharp peripheral edge, while surface 12 corresponds to surface 12 of FIG. 1. A horizontal plate 148 is secured to member 10, and is located above the peripheral edge of surface 13.

The second rotary member 98, which is preferably rotated in a direction opposite to the direction of rotation of member 90', has upwardly projecting teeth 147 also located below and opposite plate 148. Rotary member 98 has another frusto-conical surface 20 opposite the frusto-conical surface 11 and having a peripheral edge located on opposite frusto-conical surface 9, as described with reference to FIG. 1, the horizontal peripheral portions 97 and 96 being omitted. The rotary members 94' are preferably somewhat smaller than the corresponding members in the construction of FIG. 1.

As in the other embodiments of the invention, the continuously supplied amounts of reactants are supplied in constant amounts in each time unit, irrespective of whether the reactants are solid, in powder shape, liquid or gas. To maintain the amount supplied per minute constant is necessitated by the fact that even powder particles in the monomer state must be dispersed and spread uniformly and completely in a thin film-like layer. In the reaction method of the present invention, it is of greatest importance that the compounding ratio between the several reactants is always maintained absolutely constant in all reaction areas, that is on the reaction surfaces, since in the method of the invention the reaction takes place instantly when the two reactants are brought into contact. Therefore, at the moment at which the reactants contact each other, they must be present in exactly the right amount according to the required reaction ratio since otherwise a complete reaction could not take place in a continuous process. For example, if one reactant would be supplied in a greater quantity than necessary, it may not be used for the reaction with a later supplied other reactant, but would pass outwardly in the casing with the reaction mass.

Assuming that the deviations from the desired amount A of one reactant would be plus or minus $a_1$ due to inaccurateness of the feeding apparatus, and that deviations from the desired amount B of another reactant would be plus or minus $b_1$, then the maximum deflection would be plus or minus $(a_1+b_1)$. However, in practice, the inaccuracies will average out and the error may be negligible.

However, accuracy of the feeding apparatus is of great importance in the arrangement of the present invention, and conventional flow meters, or measuring pumps provided for suitable valve means may be employed in the event that the reactants are a gas or a liquid. If accurately measured amounts of solid particles are to be continuously supplied in exact quantities, the feeding apparatus illustrated in FIG. 5 is advantageously combined with the reaction machine of the invention.

FIG. 5 illustrates two feeding devices S and S' of identical construction for feeding accurately measured amounts of powdered reactants in constant quantities per time unit continuously to the inlets 4 and 5 of the casing 34 of the reaction machine, which may be constructed as shown in FIG. 1.

Conduits 1, 2 and 3 are particularly adapted for feeding liquid or gaseous reactants, and the corresponding inlets are connected to three supply pipes 101, 102 and 103 having flow meters 141, 142 and 143, respectively, and flow adjusting means 104, 105 and 106, respectively. Between flow meters 141, 142 and 143 and flow adjusting means 104, 105, 106, there are provided electrical or mechanical actuating means 144, 145, and 146 which actuate the flow adjusting means 104, 105, 106 in accordance with deviation from the desired amounts of gaseous or liquid matter flowing through the respective conduit as sensed by flow meters 141, 142, 143. In this manner, the amount of liquid or gaseous reactants can be maintained at a constant uniform level during continuous feeding. The arrangement is known, and consequently only schematically indicated in FIG. 5.

Solid reactants are pulverized to form a powder, and the respective powdered reactants are thrown into the hoppers of the two feeding devices S, S' of which only the feeding apparatus S' is illustrated in detail. Hopper 125 is located above a conveyor band 131 passing in an endless loop over rollers 129 and 130, of which at least one is driven. Hopper 125 has a projecting portion 126 in which a roller 127 is mounted which serves to maintain the amount of material on the left end of conveyor band 131 constant. A suitable cover 128 covers the end portion of the conveyor so that the powdered reactant falls directly on the top run of a conveyor band 110 which is guided over a pair of drive rollers 112 and 132. The distance between the roller 127 and conveyor band 131 may be adjusted by suitable adjusting means, not shown. When conveyor belt 131 is driven at a selected speed, a certain predetermined amount of the reactant is conveyed to conveyor band 110. Conveyor band 110 is driven at constant speed by a driven means 111.

Rollers 112 and 132 are mounted on a frame 108 which has an upwardly projecting portion 109 terminating in a portion 121 above an opening in which the knife edge 120 of a balancing lever 114 is located for supporting portion 121 and thereby frame 108, 109 with conveyor band 110. In other words, the entire conveyor is suspended on the balancing lever 114 which has a weight 115 mounted by an adjustable means 116 on its free end, and which is supported by a knife edge 119 on a support 122 of a housing 107. Members 109 and 113 are connected to each other by parallel links 123 so that when balancing arm 114 rocks, the conveyor frame moves parallel to itself, and the conveyor band 110 is maintained in horizontal position.

It is evident that by suitably selecting weight 115, the conveyor with a predetermined amount of powdered reactant thereon can be counterbalanced in such a manner that an excess of powdered reactant supplied by conveyor 131 to conveyor 110 will cause lowering of conveyor 110 and rising of the free arm of balancing lever 114, while an insufficient quantity of the reactant supplied to conveyor 110 will have the opposite effect. A pin 114a is secured to balancing arm 114 and located between the prongs of a bifurcated arm 118 secured to the vertical arm 113 and turnable with the same about a shaft 133 mounted on arm 117. An adjusting member 124 is secured to the lower end of arm 113.

When balancing arm 114 moves out of its normal position of equilibrium, member 124 is caused to move in substantially horizontal direction in opposite directions along the top surface of the conveyor band 110.

When the amount of reactant on conveyor band 110 is correct, the balancing arm 114 will be in a certain position of equilibrium in which adjusting member 124 is spaced such a distance from the top surface of conveyor band 110 to permit the passage of a layer of powder corresponding exactly to the desired amount of reactant which is to be supplied. When the weight of the powder on the conveyor band 110 is too high, arm 114 will be displaced in counterclockwise direction and turn lever means 114a, 113 in the same direction so that adjusting member 124 is moved toward conveyor band 131, scrapping an amount of powdered reactant off the conveyor band, and permitting a lesser amount of powdered reactant to remain on conveyor band 110. In this manner, the amount fed by conveyor 110 to inlet 5 is reduced, and it will be understood that if the amount of powdered reactant on conveyor band 110 is insufficient, and balancing arm 114 turns in clockwise direction, the opposite effect will be achieved. A corresponding arrangement is provided for feeding exactly measured amount of the second reactant into inlet 4.

The amount of powdered reactant fed to inlets 4 and 5 is roughly adjusted by determining the speed of movement of conveyor 131 and of conveyor 110. Small deviations from the desired quantity per minute are corrected by the adjusting means 124. An accuracy of plus or minus 1% is achieved at conveyor band 131, and an accuracy of plus or minus 0.5% at conveyor band 110. The average error in the ratio between the two reactants while within the range of plus or minus is 0.3.

The following examples are illustrative of reactions in accordance with the method of the present invention.

*Example 1.—Reaction of vinyl chloride resin*

The reaction is carried out using the embodiment of the reactant machine shown in FIG. 1 and the feeding devices shown in FIG. 5. A portion of a liquid plasticizer is fed through conduit 2 onto surfaces 12 and spread on the same by rotation, while resin powder is fed through the inlet 5 onto surface 10, spread over the same by rotation, and mixed with the liquid plasticizer, spread over surface 13 after passing over surface 12 whereby the chemical affinity of the reactants is increased. The remainder of the plasticizer is fed through conduit 1 and the powdered material and liquid plasticizer thoroughly and uniformly mixed with each other to cause a rapid and complete reaction. A lubricant, a stabilizer and dyes are supplied and mixed with the reactants travelling on the inclined surface 20. The reactants, having thus been mixed and dispersed, are finally pulverized and mixed by the projections 21, 21a and outwardly ejected into the casing. The resulting reaction mass is discharged from outlet 35 and then molded by extrusion.

In this example, the resin powder is directly employed in place of pellets which are usually used in processes for molding vinyl chloride, and consequently the steps necessary for forming the pellets in accordance with the prior art are omitted with the advantage that the undesirable heat effect on the manufactured articles can be completely eliminated whereby the heat resistance and stabilization of the articles, and the operation of the extruder are simplified. The rotary member is rotated at 3000 revolutions per minute, the diameter at the edge of the frustoconical surface is 300 mm., the average diameter of a resin particle is 0.15 mm., and the amount fed is 10 lbs. per minute.

*Example 2.—Reaction in the preparation of a phosphoric acid fertilizer*

The machine shown in FIG. 1 and the feeding devices shown in FIG. 5 are used. Ammonium hydroxide is supplied through conduit 1, and a slurry formed of pulverized serpentine having particles with a diameter of about 0.2 mm. and a $H_3PO_4$ and $H_2SO_4$ is introduced through the conduit 2, and contact reaction is effected. The rotary member is rotated at 2500 revolutions per minute, and 50 lbs. per hour of the slurry and ammonium hydroxide are supplied by the feeding device to the machine. The reaction ratio is more than 93%, and the product is obtained in substantially dry condition. An aging period, required by the corresponding process according to the prior art, can be completely omitted. Aftertreatment, such as heating, is scarcely employed.

*Example 3.—Reaction in the preparation of hydrofluoric acid*

Under the conditions described with reference to Example 2, a mixture is prepared of 80% hydrogen fluoride, 5% of sulphuric acid gas, and 5% water by adding concentrated sulphuric acid to fluorspar of 80 mesh. The moisture is evaporated by the heat of the reaction during the mixing process, residual gypsum being obtained in the form of a dry powder. Thus, aftertreatment is simplified.

*Example 4.—Saccharification reaction of wood*

Under conditions corresponding to the first example, wood powder of 150–1200 mesh is reacted with $H_2SO_4$ in the equivalent ratio. In this example as well, the period required in the process of the prior art for the aging can be completely omitted, while the yield of saccharificate is increased up to 90% and aftertreatment simplified. The reaction rate can be adjusted.

*Example 5.—Preparation of titanium compounds*

Sponge-like titanium obtained by the chloride process is heated at 900° C. in a hydrogen furnace to form hydrides. A product having a distorted structure is pulverized by a pulverizer to form particles of less than 2 mm. in diameter. The powder is continuously fed into inlet 5 at a rate of 940 gr. per minute, while powdered silicon having the same particle size is fed continuously into inlet 5 at a rate of 1080 gr. per minute, and the same time hydrogen gas is fed into conduit 2 at a rate of 0.5 Nm.$^3$ per minute, while hot air heated to about 200° C. is blown into conduit 3. The rotary members are rotated at 3000 revolutions per minute. The reaction mass thus obtained is again heated to 1150° in the hydrogen furnace for 10 minutes and pure di-silicic titanium was obtained with a yield of 92% in weight of raw materials, namely, titanium hydride and silicon powder.

*Example 6.—Preparation of resin foam*

1000 parts of polystyrol pulverized to a particle size of 0.3 mm. diameter are continuously fed into inlet 5, and 20 parts of methanol are fed into conduit 3 while 70 parts of hexane are fed into conduit 2. The rotary members are rotated at 2000 revolutions per minute. The resulting product is cast in a metal mold provided with degassing pores and is subjected to an expansion treatment by vapor at 95° C. for 15 minutes whereby polystyrol foam is obtained.

According to the process of the prior art, polystyrol particles mixed with a foaming agent must be left for a day and a night at least so that the polystyrol is fully impregnated with the foaming agent. This is unnecessary in the method of the present invention, and the foaming treatment can be easily carried out.

*Example 7.—Reaction in the preparation of solid grape sugar*

The embodiment of the machine shown in FIG. 4 provided with the continuous feeding devices shown in FIG. 5 are used in this reaction. Concentrated sulphuric acid liquid having a viscosity of Baumé 42° is fed to the surface 12 and spread over the same. Liquid droplets thrown from the peripheral edge of surface 13 are disintegrated by projecting teeth 147 of member 98. Very small droplets are thus obtained which are thrown against surface 11 of member 94' and added to crystal grape sugar powder of 100 mesh supplied from inlet 5 and spread over surfaces 9 and 11 of members 94' and 95' whereby the crystal is instantly enlarged due to the deposit of liquid on the powdered particles. Solid grape sugar powder thus obtained is discharged from outlet 35.

The amount of supplied liquid is 38% of raw crystal. It is preferred to rotate surface 13 at a very high speed to cause formation of minute droplets. However, since members 94' and 95' and member 98 will have to rotate at a very high speed, the particles may become completely destroyed. Consequently, it is preferred to rotate surface 13 of member 98 at a reduced speed, for example, at about 800 revolutions per minute. The teeth 147 function effectively to form minute droplets even at a restricted rotary speed, while the annular plate portion 148 prevents the powder particles from entering at random between the teeth 147 whereby destruction of the particles is avoided.

*Example 8.—Reaction for preventing the fermentation of rice bran*

The machine illustrated in FIG. 1 and provided with the feeding devices shown in FIG. 5 is employed. Chlorine gas is introduced through conduit 2 and supplied to surface 13, and thrown outwardly to be added to rice bran supplied through inlets 4 and 5 and spread over surfaces 9 and 11 after passing over surfaces 8 and 10. The rice bran is permitted to absorb an amount of gas coresponding to 0.3% of the amount of rice bran. Rice bran thus treated is protected from fermentation and decomposition. After a long period of storage oil extraction yield was found to be 50%.

The foregoing examples are only illustrative, and it will be appreciated that the reaction machine of the present invention can be used for an unlimited number of different chemical reactions.

In order to accomplish more effectively the object of the present invention, it is preferred to pulverize solid reactants to form as small particles as possible, but it is not always necessary to make particles of exactly uniform size. The machine can be easily adapted to a specific reactant by suitably selecting the diameter of the particles of the reactant, the number of revolutions of the rotary members, the amount of reactants fed to the machines, and the diameter of the rotating surfaces, which is carried out in accordance with the above discussed equation.

The amount of raw materials required for a specific reaction is generally determined by a calculation based on the theoretical amount of the product to be obtained, although this does not necessarily mean that such amount is based on the respective reaction formula. As explained above, the present invention achieves an instant reaction which is quite different from reaction methods of the prior art where two or more different reactors, which have been previously compounded, are mixed and aged within a reactor. In the process of the prior art, non-uniformity of the compounding ratio cannot be avoided in small portions of the mixture, even if the amounts of reactants contained in the reactor are provided in a certain compounding ratio. However, in accordance with the present invention the desired ratio is accurately maintained in minute portions of the mixture, and even for particles of the reactants.

Consequently, by the method of the invention it is possible to effect an unusual reaction, for example, a reaction where the amount of one of the reactants used in the reaction, is half the theoretically required amount. In such a reaction, which is different from a normal reaction, the excess of the respective reactor, will also react, and the reaction will proceed to a condition in which materials supplied in excess over the normal ratio are all uniformly sub-reacted. It is evident that a product obtained by such a reaction may have peculiar properties. In other words, the present invention makes it possible to carry out reactions whose exact theory and mechanism is unknown, and to thus produce unknown substances.

A reaction machine according to the present invention is advantageously employed instead of the agitation type reactors or vibration type reactors of the prior art with substantially improved effects. The time for the reaction and aging which require several days in the methods of the prior art is suitably shortened when the method of the invention is carried out by the machine of the invention, and no catalyzer, or only a very small quantity thereof, is required for the reaction. Drying treatment, which is indispensable in accordance with prior art methods, becomes unnecessary and the reaction efficiency is improved with all reactants being reacted uniformly. Thus, a product having excellent quality is obtained.

It is evident that the equipment, as well as the process, is simplified since the structure of the reaction machine is very simple, and even if the rotary members are rotated at very high speeds, the maintenance and service will cause no trouble due to the construction of the rotary members which spin like a top about a vertical axis and are maintained in the desired position by inertia. The high speed and completeness of the reaction, and other advantages explained above, may be attributed to the fact that the reactors are accurately and completely dispersed and spread so that actually particles of the substances are placed adjacent each other. Since the substances move relative to each other while being spread on the rotary surfaces, the reaction is further improved. It is known that the relative speed between reacting particles is an important factor in promoting a reaction. According to the present invention, the reactants move relative to each other just at the place where the reaction takes place. By rotating the rotary members in opposite directions, a relative speed corresponding to twice the speed of particles thrown from the peripheral edge of an inner rotary surface can be obtained. All these factors attribute to a rapid and highly efficient reaction, which cannot be achieved by prior art methods and apparatus.

It will be understood that each of the elements described above, or two or more together, may also find a useful application in other types of reaction methods differing from the types described above.

While the invention has been illustrated and described as embodied in a reaction machine including rotary surfaces, and a reaction method using the centrifugal force, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a reaction machine, in combination, a rotary member rotatable about an axis and having two concentric annular first surfaces being spaced from and independent of each other and disposed at an angle to said axis and bounded by peripheral edges, and a second surface disposed at an angle to said first surfaces and located opposite and outwardly of said peripheral edges of the first surfaces, said second surface being bounded by a peripheral edge; two supply means for supplying a first reactant to one of said first surfaces and a second reactant to the other of said first surfaces; means for rotating said rotary member whereby said first and second reactants are spread over and move outwardly on said two first surfaces beyond said peripheral edges of the same and impinge said second surface to react with each other whereupon the reaction mass passes beyond said peripheral edge of said second surface; and means located outwardly of said peripheral edges for collecting said reaction mass.

2. In a reaction machine, in combination, a first rotary member rotatable about an axis and having a first annular surface disposed at an angle to said axis and bounded by a peripheral edge, and a second annular surface being spaced from and independent of said first surface and disposed at an angle to said first surface and located opposite the same, said second surface being bounded by a peripheral edge; first supply means for supplying a first reactant to said first surface; second supply means for supplying a second reactant to said second surface; means for rotating said first rotary member whereby said first reactant is spread over, and moves outwardly on said first surface beyond said peripheral edge, and whereby said second reactant is spread over and moves outwardly on said second surface and over said edge thereof and is mixed with said first reactant to react with the same whereupon the reaction mass passes beyond said peripheral edge of said second surface; a second rotary member coaxial with said first rotary member and having at least one surface disposed at an angle to said second surface and having a peripheral edge located opposite and outwardly of said edge of said second surface; third supply means for supplying a third reactant to said surface of said second rotary member; and means for rotating said second rotary member in such a manner that said surface thereof moves relative to said edge of said second surface whereby said reaction mass impinges said surface of said second member and is mixed with said third reactant to react with the same so that a reaction mass passes beyond said edge of said surface of said second rotary member; and casing means for collecting said last-mentioned reaction mass and being located outwardly of said peripheral edge of said surface of said second member.

3. In a reaction machine, in combination, a first rotary member rotatable about an axis and having two concentric annular first surfaces being spaced from and independent of each other and of revolution disposed at an angle to said axis and bounded by peripheral edges, and a second surface of revolution disposed at an angle to said first surfaces and located opposite and outwardly of said peripheral edges of the same, said second surface being bounded by a peripheral edge; two supply means for supplying a first reactant to one of said first surfaces and a second reactant to the other of said first surfaces; supply means for supplying another reactant to said second surface; means for rotating said rotary member whereby said first and second reactants are spread over and move outwardly on said two first surfaces beyond said peripheral edges of the same and impinge said second surface and whereby said other reactant moves outwardly on said second surface and is mixed with said first and second reactants to react with the same whereupon the reaction mass passes beyond said peripheral edge of said second surface; a second rotary member coaxial with said first rotary member and having at least one surface of revolution disposed at an acute angle to said second surface and having a peripheral edge located opposite and outwardly of said edge of said second surface; third supply means for supplying a third reactant to said surface of revolution of said second rotary member; means for rotating said second rotary member in such a manner that said surface thereof moves relative to said edge of said second surface whereby said reaction mass impinges said surface of said second member and is mixed with said third reactant to react with the same so that a reaction mass passes beyond said edge of said surface of said second rotary member; and casing means for collecting said last-mentioned reaction mass and being located outwardly of said peripheral edge of said surface of said second member.

4. A reaction machine as set forth in claim 3 wherein said first surfaces are substantially parallel, and wherein said first member includes an additional surface of revolution substantially parallel to said second surface of revolution and being disposed outwardly of said peripheral edge of said surface of said second rotary member and extending at an angle to said last mentioned surface; and including additional supply means for supplying a reactant to said additional surface whereby the reaction mass passing beyond said edge of said surface of said second rotary member impinges said additional surface and reacts with the reactant thereon to form another reaction mass; and wherein said casing means are located outwardly said peripheral edge of said additional surface to collect said other reaction mass.

5. A reaction machine as set forth in claim 4 wherein said first member has an annular peripheral portion located outwardly of said surfaces of the same; wherein said second member has an annular peripheral portion located outwardly of said surface of the same and extending transversely to said additional surface, said annular peripheral portions being parallel to each other and located in planes perpendicular to said axis; and intermeshing axial projections on said annular portions whereby the reaction mass passing beyond the peripheral edge of said additional surface impinges the surface of said peripheral portion of said second member and passes outwardly between said intermeshing projections so as to be dispersed before being collected by said casing means.

6. A reaction machine as set forth in claim 3 wherein said means for rotating said first member includes a vertical drive shaft secured to said first member coaxial with the same; and wherein said means for rotating said second member includes a tubular vertical drive shaft surrounding said drive shaft and being secured to said second member coaxial with said drive shaft; and means secured to said shafts for rotating the same in opposite directions.

7. A reaction machine as set forth in claim 3 wherein said second member includes an additional surface of revolution concentric with said axis, substantially parallel to said first surfaces of said first member, and located inwardly of said first mentioned surface of said second member and having a peripheral edge extending transversely to said second surface of said first member; and supply means for supplying a reactant to said additional surface of said second member so that said last mentioned reactant passes toward said second surface to react with the mass on the same.

8. In a reaction machine, in combination, a first rotary member rotatable about an axis and having a first annular surface disposed at an angle to said axis and bounded by a peripheral edge; a second rotary member coaxial with said first rotary member and having a second annular surface being spaced from and independent of said first surface and disposed at an angle to said first surface of revolution and located opposite and outwardly of said peripheral edge of the same; first supply means for supplying a first reactant to said first surface; second supply means for supplying a second reactant to said second surface; means for rotating said rotary members in such a manner that said second surface moves relative to said first surface and said peripheral edge thereof whereby said first and second reactants are respectively spread over said surfaces, and whereby said first reactant passes beyond said peripheral edge of said first surface and impinges said second surface to mix and react with said reactant on the same whereby a reaction mass is formed; and casing means for collecting said reaction mass and located outwardly of said second surface so as to be impinged by the reaction mass.

9. In a reaction machine, in combination, a first rotary member rotatable about an axis and having two parallel concentric annular first annular surfaces disposed at an angle to said axis and bounded by peripheral edges having different diameters; a second rotary member coaxial with said first rotary member and having a second annular surface being spaced from and independent of said first surface and disposed at an angle and extending transversely to said first surfaces, opposite and outwardly of the peripheral edge of the inner first surface, and having a peripheral edge located inwardly of the outer first surface; two first supply means for supplying first and second reactants to said first surfaces; second supply means for supplying a third reactant to said second surface; means for rotating said rotary members in such a manner that said second surface moves relative to said first surfaces whereby said reactants are respectively spread over said surfaces, and whereby said first reactant impinges said second surface to react with said third reactant on said second surface, and whereby the reaction mass passes from said second surface to said outer first surface to react with the reactant on the same whereby a reaction mass is formed; and casing means for collecting said reaction mass and located outwardly of said outer first surface so as to be impinged by the reaction mass.

10. A reaction machine as set forth in claim 9 wherein said axis is vertical, and wherein said first surfaces are frusto-conical and have said peripheral edges on the lowermost portion thereof; and wherein said second surface of revolution is frusto-conical and having said peripheral edge thereof on the highest portion thereof.

11. A reaction machine as set forth in claim 10 wherein said first rotary member has a conduit extending from said second supply means to a chamber formed between said first and second rotary members inwardly of said second surface.

12. A reaction machine as set forth in claim 10 wherein said second member includes a frusto-conical surface substantially parallel to said second surface and located between the same and said chamber; and wherein said first member includes an annular horizontal peripheral portion located opposite the peripheral edge of said last mentioned conical surface.

13. In a reaction machine, in combination, a first rotary member rotatable about an axis and having two concentric annular first surfaces being spaced from and independent of each other and of revolution disposed at an acute angle to said axis and bounded by peripheral edges, and a second surface of revolution disposed at an acute angle to said first surfaces and located opposite and outwardly of said peripheral edges of the same, said second surface being bounded by a peripheral edge; two supply means for supplying a first reactant to one of said first surfaces and a second reactant to the other of said first surfaces; supply means for supplying another reactant to said second surface; means for rotating said rotary member whereby said first and second reactants are spread over and move outwardly on said two first surfaces beyond said peripheral edges of the same and impinge said second surface and whereby said other reactant moves outwardly on said second surface and is mixed with said first and second reactants to react with the same whereupon the reaction mass passes beyond said peripheral edge of said second surface; a second rotary member coaxial with said first rotary member and having at least one surface of revolution disposed at an acute angle to said second surface and having a peripheral edge located opposite and outwardly of said edge of said second surface and an annular separating surface forming a gap with said second surface and extending substantially at the same angle inwardly of said surface of revolution, said second member having passages therethrough inwardly of said separating surface; third supply means for supplying a third reactant to said surface of revolution of said second rotary member; means for rotating said second rotary member in such a manner that said surfaces thereof move relative to said edge of said second surface whereby solid particles of the reaction mass pass through said passage and liquid particles impinge said surface of revolution of said second member and are mixed with said third reactant to react with the same so that a reaction mass passes beyond said edge of said surface of said second rotary member; and casing means for collecting said last-mentioned reaction mass and being located outwardly of said peripheral edge of said surface of said second member and including outlet means for said solid particles.

14. A machine as set forth in claim 13 and including a separating means in said casing means having an outlet and being located opposite said edge of said second rotary member and disposed so that the liquid particles of said reaction mass moving in a horizontal plane impinge said separating means and are discharged through an outlet, and so that solid particles pass said separating means by, impinge said casing means and pass through said outlet means of the same.

15. In a reaction machine, in combination, a first rotary member rotatable about an axis and having two parallel concentric annular first surfaces disposed at an angle to said axis and bounded by peripheral edges having different diameters; a second rotary member coaxial with said first rotary member and having a second surface disposed at an angle and extending transversely to said first surfaces, opposite and outwardly of the peripheral edge of the inner first surface, and having a peripheral edge located inwardly of the outer first surface, said outer first surface and said second surface being each a surface composed of two frustoconical surface portions defining different angles with said axis; two first supply means for supplying first and second reactants to said first surfaces; second supply means for supplying a third reactant to said second surface; means for rotating said rotary members in such a manner that said second surface moves relative to said first surfaces whereby said reactants are respectively spread over said surfaces, and whereby said first reactant impinges said second surface to react with said third reactant on said second surface, and whereby the reaction mass passes from said second surface to said outer first surface to react with the reactant on the same whereby a reaction mass is formed; and casing means for collecting said reaction mass and located outwardly of said outer first surface so as to be impinged by the reaction mass.

16. In a reaction machine, in combination, a rotary member rotatable about an axis and having two concentric annular first surfaces being spaced from and independent of each other and disposed at an angle to said axis and bounded by peripheral edges, and a second surface disposed at an angle to said first surfaces and located opposite and outwardly of said peripheral edges of the first surfaces, said second surface being bounded by the peripheral edge; two supply conduit means for supplying a first reactant to one of said first surfaces and a second reactant to the other of said first surfaces; two feeding devices for supplying powdered first and second reactants to said supply conduit means, at least one of said devices including a conveyor discharging into one of said supply conduits, means for supplying a powdered reactant to said conveyor, means for suspending said conveyor including a balancing beam and weight means for balancing said conveyor with the reactant thereon and acting on said balancing beam, and adjusting means controlled by said balancing beam when the same is displaced out of a position of equilibrium so as to adjust the quantity of reactant transported by said conveyor; means for rotating said rotary member whereby said first and second reactants are spread over and move outwardly on said two first surfaces beyond said peripheral edges of the same and impinge said second surface to react with each other whereupon the reaction mass passes beyond said peripheral edge of said second surface; and means located outwardly of said peripheral edges for collecting said reaction mass.

References Cited
UNITED STATES PATENTS

| | | | |
|---|---|---|---|
| 1,629,200 | 5/1927 | Buhtz | 23—285 X |
| 2,429,864 | 10/1947 | Alvord | 198—39 |
| 2,502,490 | 4/1950 | Sweet | 23—285 |
| 2,703,275 | 3/1955 | Elliott et al. | 23—252 X |
| 2,762,683 | 9/1956 | Massey | 23—1 |
| 3,002,805 | 10/1961 | Browning et al. | 23—1 |
| 3,051,454 | 8/1962 | Goos et al. | 259—6 |
| 3,118,739 | 1/1964 | Atkinson et al. | 23—285 |
| 3,163,402 | 12/1964 | Yamashita | 259—6 |

JOSEPH SCOVRONEK, *Acting Primary Examiner.*

MAURICE A. BRINDISI, JAMES H. TAYMAN, JR., MORRIS O. WOLK, *Examiners.*

E. STERN, *Assistant Examiner.*